United States Patent [19]

Champalaune et al.

[11] Patent Number: 5,992,304
[45] Date of Patent: Nov. 30, 1999

[54] APPARATUS FOR TREATMENT OF FOOD PRODUCTS

[75] Inventors: Jean-Claude Champalaune, Saint Méen le Grand; Yvon Corveler, Pontivy, both of France

[73] Assignee: Kaufler S.A., Loudeac, France

[21] Appl. No.: 09/142,225

[22] PCT Filed: Mar. 7, 1997

[86] PCT No.: PCT/FR97/00407

§ 371 Date: Sep. 3, 1998

§ 102(e) Date: Sep. 3, 1998

[87] PCT Pub. No.: WO97/34494

PCT Pub. Date: Sep. 25, 1997

[30] Foreign Application Priority Data

Mar. 18, 1996 [FR] France .................................. 96/03556

[51] Int. Cl.⁶ .............................. A23L 1/01; A47J 27/20; A22C 7/00

[52] U.S. Cl. ................................ 99/349; 99/355; 99/384; 99/441; 99/517

[58] Field of Search .................... 99/349–351, 441, 99/355, 384, 517, 330; 100/265, 910; 206/503, 511; 220/628; 248/146; 249/82, 167; 426/523

[56] References Cited

U.S. PATENT DOCUMENTS

| | | | |
|---|---|---|---|
| 1,863,609 | 6/1932 | Vanderkloot | 99/351 |
| 2,310,956 | 2/1943 | Hoy | 99/351 |
| 3,580,165 | 5/1971 | Foldenauer | 99/351 |
| 3,796,144 | 3/1974 | Foldenauer et al. | 99/355 |
| 4,891,237 | 1/1990 | Rabotski | 99/441 X |
| 4,957,271 | 9/1990 | Summers et al. | 99/351 X |

FOREIGN PATENT DOCUMENTS

| | | |
|---|---|---|
| 0 292 417 A2 | 11/1988 | European Pat. Off. . |
| 0292417 | 11/1988 | European Pat. Off. . |
| 0 625 325 A1 | 11/1994 | European Pat. Off. . |
| 0625325 | 11/1994 | European Pat. Off. . |
| 2 581 840 | 11/1986 | France . |
| 2581840 | 11/1986 | France . |
| 2672270 | 4/1992 | France . |
| 2 672 270 | 8/1992 | France . |
| 33 15 311 A1 | 12/1983 | Germany . |
| 3315311 | 12/1983 | Germany . |

Primary Examiner—Timothy Simone
Attorney, Agent, or Firm—Pollock, Vande Sande & Amernick

[57] ABSTRACT

A unit for molding and heat treating food products, including a series of parallel, horizontal, upwardly facing generally U-shaped molds. A lid element extends under the bottom of each mold, and the entire mold assembly is fixed to support means which permit stacking of the units, the lid elements then engaging in the channel openings of an underlying unit, defining individual fluid-tight conduits which receive heat-conveying fluid for treatment, by heat exchange, of food products contained in the channels.

11 Claims, 2 Drawing Sheets

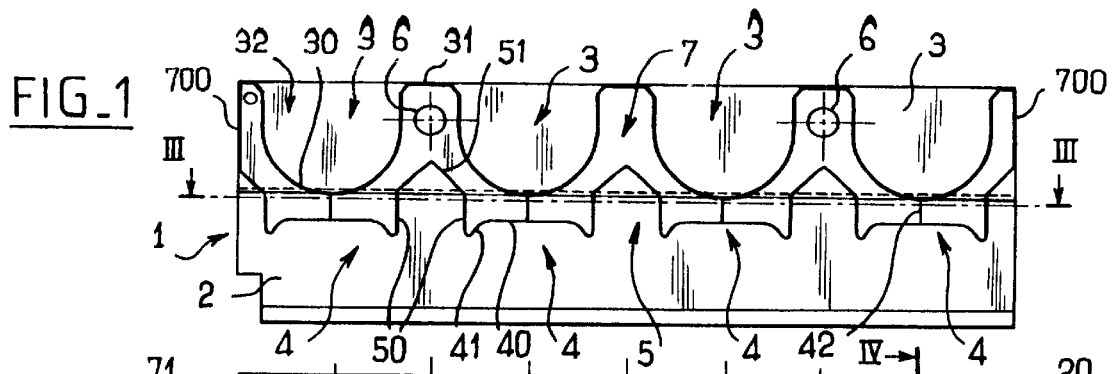
FIG_1
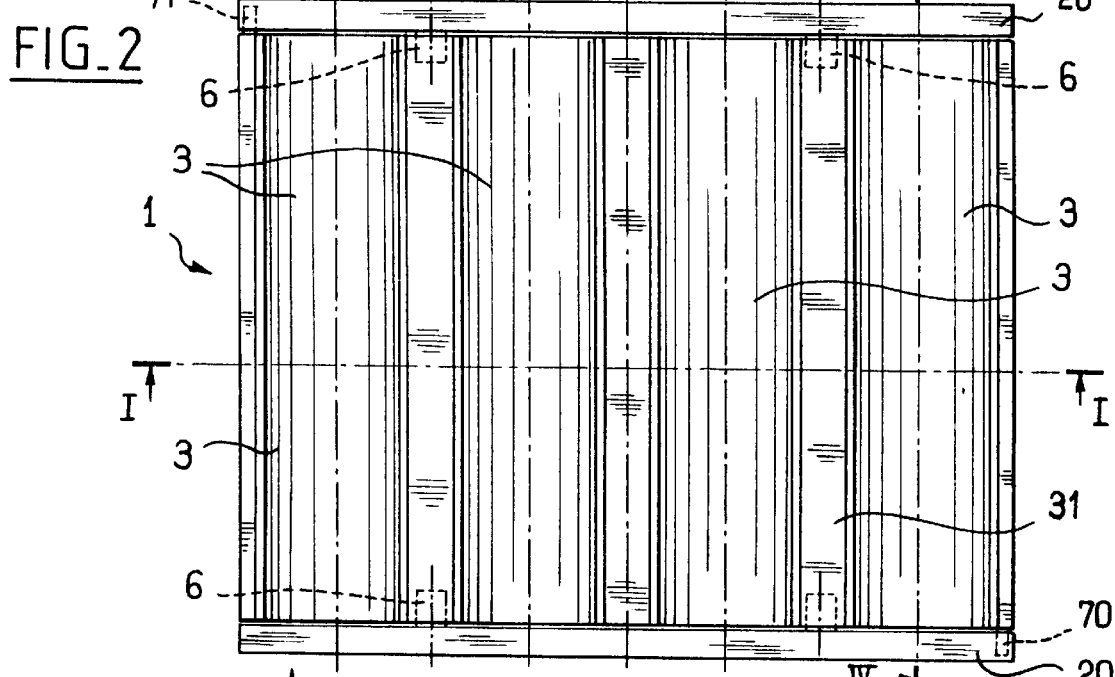
FIG_2
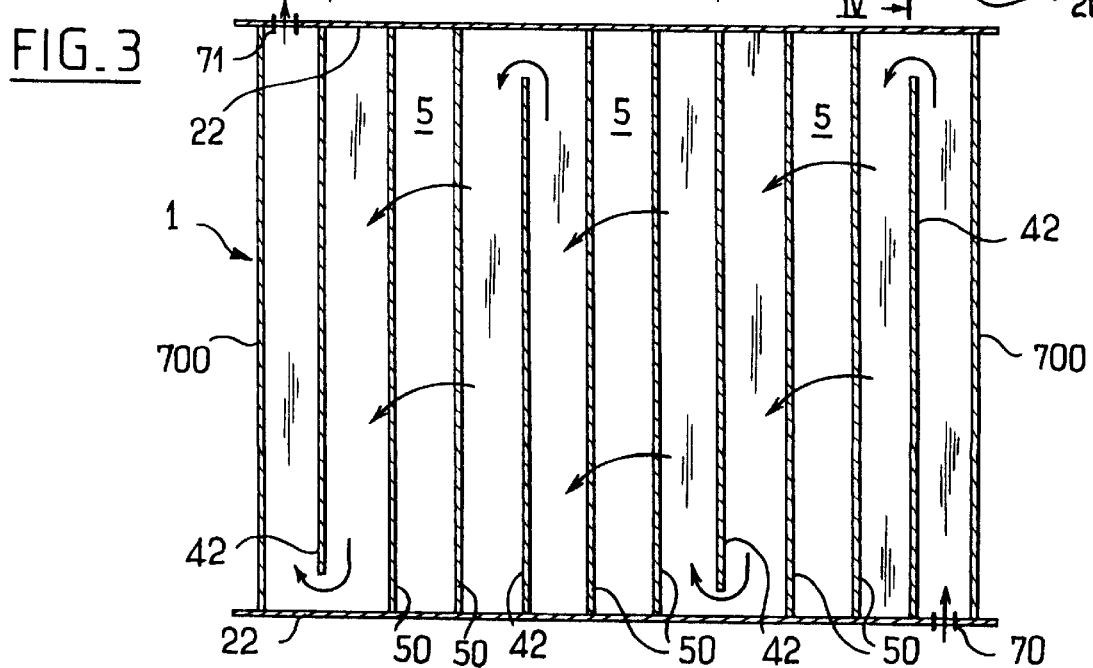
FIG_3

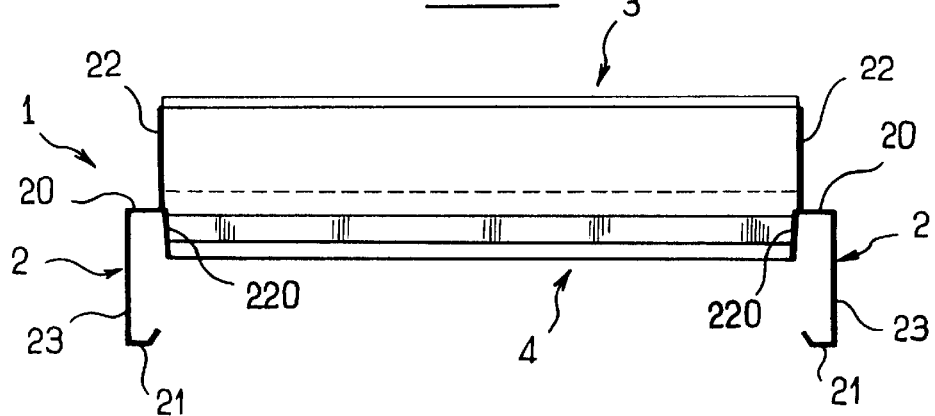
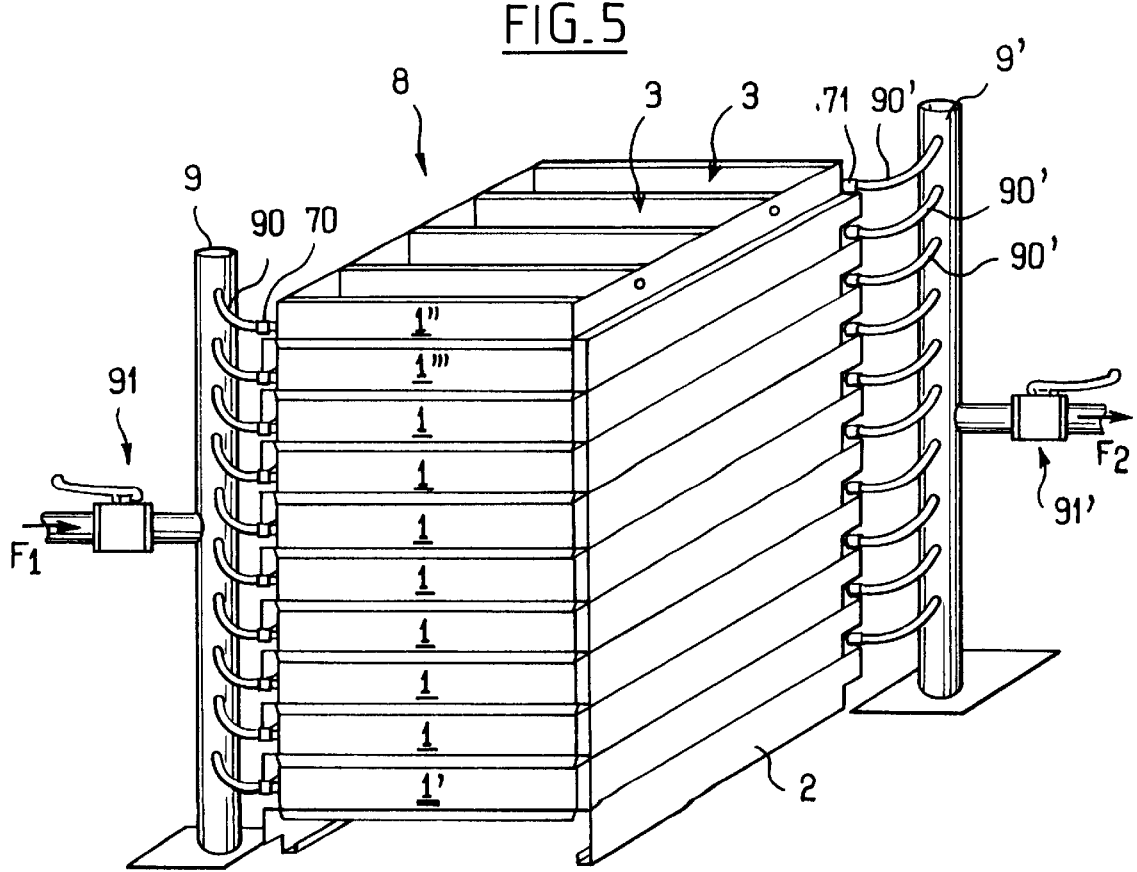

APPARATUS FOR TREATMENT OF FOOD PRODUCTS

FIELD OF THE INVENTION

The present invention concerns a unit for the molding and heat treatment of food products, for example for the cooking of hams.

It also concerns a plant comprising a plurality of molding unit of the above type.

BACKGROUND OF THE INVENTION

Units for the molding of food products, particularly for the cooking of hams, have already been proposed.

A unit of the above kind typically comprises an assembly of molds configured like channels arranged horizontally, side-by-side and parallel to each other, is their bottoms being directed downwards and their openings upwards. The assembly of the molds is fixed to support means which provide for the piling of units on one another.

Applicants' FR-A-2 672 270, relates to a unit of the above kind.

In some embodiments, each channel is attached to a plate that extends under its bottom, forming a double-bottom. The double-bottom plates serve as lid elements adapted to engage in the channel openings of an underlying unit in a pile.

The use of lids is particularly beneficial for cooking hams because the meat is then confined in a well-defined volume in which it is maintained under pressure which eliminates voids and determines its final shape.

Two main techniques have been used until now for the heat treatment of food products, in this instance for the cooking of hams.

The first uses chambers, cells or tunnels for cooking. These are enclosures with dimensions suited to receiving at least one "trolley", this term designating, in the art concerned, an assembly of a plurality of piled molding units movable on a rolling path. The enclosure is generally dimensioned to contain two to twelve trolleys.

Steam is generally diffused into the enclosure to cook the hams.

Plants of the above kind, which require good thermal insulation of the enclosure and use fans for circulating the steam used for cooking, are costly to acquire and to maintain.

There also arises a problem associated with contact between the heat-conveying fluid—steam in this instance— and the products to be treated, namely, a risk of microbial contamination of the products.

The second technique uses cooking tanks or pots of generally parallelepiped shape provided with a lid. The cooking is done in water heated either by means of an auxiliary device such as a boiler or within the tank itself, by heat exchange or by injecting steam.

Tanks of the above kind are not convenient to use because it is necessary to load the cooking units into them from above, for example using a winch or a traveling overhead crane.

Moreover, the contamination problem is also encountered with this method.

SUMMARY OF THE INVENTION

An object of the present invention is to remedy these drawbacks.

To be more precise, a first objective of the invention is to provide a unit for the molding of food products that is itself provided with means for performing heat treatment of the products. This significantly reduces the cost of the operation.

A second objective is to be able to carry out the treatment without any contact between the heat-conveying fluid and the food products, in order to eliminate virtually all risk of contamination.

The invention also aims to achieve the above objective using means that are simple, low in cost and easy to use.

To this end, the applicant has exploited the "dead" space, i.e., the unused space, found in the prior art units between the bottom of a channel and the lid element (double-bottom) under it.

The molding and heat treatment unit of the present invention comprises an assembly of molds configured like channels arranged horizontally, side by side and parallel to each other, their bottoms being directed downwards and their openings upwards, and a lid element extending under the respective bottom being associated with each channel, the assembly of molds being fixed to support means which provide for the piling of units, the lid elements being then engaged in the channel openings of an underlying unit.

The channels and the lid elements are made of a material that is a good conductor of heat.

In accordance with the invention, the above unit is noteworthy in that each channel is fixed to the associated lid element in such a way as to delimit an individual fluid-tight conduit which receives a heat-conveying fluid for the treatment, by heat exchange, of food products contained in the channels.

In this way, a fluid-tight space is formed around each channel in which a heat-conveying fluid such as water, oil or steam, for example, is circulated.

The heat treatment, for example the cooking, of the products is then efficacious and homogeneous because the heat-conveying fluid surrounds a large part, or even all, of the products.

In a preferred embodiment, each of the individual conduits extends not only under the associated channel but also along its lateral flanks, so that all of the wall of the channel (all of the periphery of its cross-section) is exposed to heat exchange with the heat-conveying fluid.

In this way, each elementary conduit surrounds the wall of the corresponding channel completely or almost completely.

Because the lid of the top unit, which constitutes a portion of the wall of the conduit of that unit, fits in the opening of the channel, all of the product contained in the channel is surrounded by the heat-conveying fluid.

In accordance with other advantageous but non-limiting features of the invention:

- the various individual conduits delimited by a channel and an associated lid element communicate with each other to form a single conduit within the unit;
- the individual conduits are divided by a discontinuous intermediate partition;
- the partition extends longitudinally under the associated channel and is shorter than the channel so as to leave a passage for the heat-conveying fluid at one end of the partition;
- the end passages alternate to encourage circulation of the fluid in a chicane;
- the unit includes connectors for connection to a heat-conveying fluid supply and to means for evacuating the fluid; and the transverse walls of the conduit each include at least one blind hole opening towards the exterior to enable the unit to be grasped and manipulated.

The invention also relates to a plant for the molding and heat treatment of food products, particularly for the cooking of hams, which plant comprises a plurality of piled units such as those described hereinabove, and which is equipped with a heat-conducting fluid supply and with means for evacuating the fluid, to each of which each unit is connected.

In one embodiment of the plant, the fluid is a hot liquid for cooking the food products.

In another embodiment, the fluid is a cold liquid for chilling and/or freezing the food products.

BRIEF DESCRIPTION OF THE DRAWINGS

Other features and advantages of the present invention will become apparent upon reading the following detailed description of a preferred embodiment. The description refers to the drawings, in which:

FIG. 1 is a view in cross-section of a unit in accordance with the invention;

FIG. 2 is a plan view of the unit of FIG. 1 along line I—I;

FIG. 3 is a schematic plan view of the unit of FIG. 1 in section on the horizontal plane III-III;

FIG. 4 is a view of the same unit in section on the section plane IV—IV in FIG. 2; and FIG. 5 is a simplified perspective view of plant comprising a plurality of units in accordance with the invention.

DESCRIPTION OF PREFFERRED EMBODIMENT

The molding unit 1 shown in FIGS. 1 to 4 comprises four metal molds 3 configured like channels. They have a "U" shaped cross-section with the opening 32 facing upwards and the semi-cylindrical bottom 30 facing downwards. Their flanks are substantially vertical and their top edge is bent outwards. At this level, they are linked in pairs by a longitudinal strip 31.

At each end, the channels 3 are welded to a flange 2. The flanges are metal plates with multiple bends, the lower part 23 of which extends downwards, well below the channels, and is offset outwards.

The bottom of the flanges is bent inwards (FIG. 4) to form horizontal bearing faces 21 adapted to bear on horizontal intermediate faces 20 that correspond to the outward offset of the middle part of the flanges.

The upper part 22 of the flanges serves as a partition closing off the end of the channels.

The molding units can therefore be piled on each other, the bearing faces 21 of one unit locating and bearing on the faces 20 of the underlying unit.

An arrangement of this kind is well known per se, in particular from FR-A-2 672 270, to which reference may be had if required.

The flanges therefore support all the channels, are used to pile the various units, and serve as end walls of the channels.

In a manner known per se a lid element 4 adapted to fit in the opening of the underlying channel in the pile is associated with each channel.

In some prior art molding units, these lid elements 4 are fixed, generally welded, directly to the channels and/or to the flanks 2.

The entire unit 1, and in particular the channels and the lid element, are made of a rigid material that is a good conductor of heat, for example stainless steel.

In accordance with the present invention, each channel 3 is fixed to the associated lid element 4 so as to delimit a fluid-tight conduit (or passage) 7 extending below and along the flanks of the channels and which is adapted to receive a heat-conveying fluid for the treatment, by heat exchange, of the food products contained in the channels.

In the embodiment of FIGS. 1 to 4 the conduit 7 is delimited at the top by the wall of the channels 3 and the associated strips 31, and at the bottom by the lid elements 4 and by the intermediate members 5. The conduit 7 is formed of a series of individual conduits that each extend below and laterally around a channel.

In the embodiment shown, each lid element 4 has a horizontal central part 40 the longitudinal edges 41 of which are curved downwards.

The lid elements are connected in pairs by the intermediate members 5. These have two vertical parts 50 which are joined to the lid elements and which are linked by an angle-iron 51 with an inverted "V" shape cross-section.

As shown more precisely in FIGS. 1 and 3, the conduit 7 contains a series of intermediate partitions 42 forming a chicane. These vertical partitions extend longitudinally under the bottom of each channel 3. They are fixed, for example welded, to the channel and/or to the associated lid element.

The outside two individual conduits are closed laterally by a longitudinal partition 700. The assembly of individual conduits is closed at the ends by the parts 22 of the flanges and at the level of the lids (below the offset 20) by extensions 220 of the parts 22 (see FIG. 4). The extensions 220 are welded on with a slight inclination so as not to impede the piling of the units on each other.

As can be seen in FIG. 3 in particular, each partition 42 is interrupted so that it extends along only part of the length of the channels. Moreover, the partitions 42 of two adjacent channels are disposed so that their end passages alternate to form a chicane. The benefit of a structure of this kind will be explained hereinbelow.

At the opposite ends of the conduit, i.e., near opposite corners of the unit (see FIG. 3), tubes 70 and 71 establish communication between the interior of the conduit 7 and the exterior. The tubes are connectors for connecting the unit to a heat-conveying fluid supply and to means for evacuating the fluid.

Blind holes 6 with their opening facing outwards are provided on the flanges 2, facing the areas corresponding to the conduits 7. The holes enable the units of the invention to be grasped and handled.

FIG. 5 shows in perspective plant 8 for the molding of food products which uses a plurality of units like those described hereinabove.

In the example shown, ten units are piled on one another, the bottom unit 1' having its flanges 2 resting directly on the floor. The number of units can of course be different.

The plant includes a common manifold 9 in the form of a vertical column to which are connected heat-conveying fluids supply means 91 and a series of pipes 90. These can be flexible hoses, for example. They are connected to the tubes 70 equipping each of the units 1. The connecting means are preferably chosen to enable quick and efficacious connection.

In a similar way, the plant includes a second manifold 9' for evacuating the fluid from the units. To this end, it is provided with a series of pipes 90' similar to the pipes 90 connected to the tubes 71 of the units and with evacuation means 91'.

Apart from the top unit 1" (FIG. 5) all the units have channels filled with a food product to be treated, for example a raw ham vacuum-packed in a plastic material.

The function of the top unit 1" is to convey the required heat to the hams in the underlying unit 1''', to be more precise to the upper part of the hams, via its lid elements.

When the fluid is hot water, it is supplied by an auxiliary heating system such as a boiler.

An ad hoc supply system, which constitutes a closed circuit, for example, feeds hot water from the boiler to the pile of units via the manifold 9 (arrow $F_1$, FIG. 5).

FIG. 3 is a diagram showing the path of the flow of water within a unit 1 from the inlet 70 to the outlet 71. The path is symbolized by arrows. The water can pass freely in the transverse direction over the inverted "V" shape members 5 (from one individual conduit to another) and make a half-turn at the ends of the discontinuous partition 42.

The intermediate partitions 42 cause the fluid to follow a path in the form of a chicane, for improved heat exchange. The hot fluid transfers some of its heat to the walls of the channels which, made from a material that is a good conductor of heat, transmit the heat to the food products. Thus the products can be cooked directly in the piles, without using separate cooking cells.

The cooled fluid leaving the units returns to the boiler via the manifold 91 (arrow $F_2$, FIG. 5). The closed fluid circuit is controlled and its temperature is regulated by conventional means.

At the end of cooking, a cold fluid can be circulated in the units to cool the food products before removing them from the molds.

In the case of hams, for example, which generally require a "core" cooking temperature in the order of 65° C. to 70° C., the heat-conveying fluid can be water at a temperature in the range approximately 70° C. to approximately 85° C., the treatment time being in the order of approximately eight hours to approximately twelve hours (depending on the nature, the shape and the dimensions of the hams).

The shape of the channels and the lids is naturally adapted to suit that of the food products. The latter can be packaged in the form of rods or blocks if the channels are compartmented.

Accordingly, the cross-section of the channels can be rectangular, square or trapezoidal ("V" with cut off corner) rather than "U" shape, for example; the cross-section is not necessarily symmetrical.

Because of the invention, the cooking is efficacious and homogeneous because the fluid surrounds all or virtually all of the wall containing each food product. The upper part of the products receives heat from the channels of the unit immediately above them. There is no contact between the heat-conveying fluid and the products, which significantly reduces the risk of contamination.

The units and the plant of the invention can of course be used to chill or even to freeze food products using an appropriate fluid.

In the example shown in the drawings there is a single conduit 7 for each unit 1. Nevertheless, it is possible to provide one conduit per channel and lid element combination. In this case, it is necessary to provide for each unit as many pairs of tubes 70 and 71 as there are conduits.

The present invention can be applied to any type of food product, containing meat or otherwise.

The invention claimed is:

1. A unit for the molding and heat treatment of food products, said unit comprising an assembly of molds in a form of parallel horizonal channels, bottoms of said channels being directed downwards and openings of said channels being directed upwards, a lid element extending under the respective bottom being associated with each channel, said assembly of molds being fixed to support means which provide for stacking of said units, said lid elements being engaged in said openings of the channels of an underlying unit, said channels and said lid elements being made of a material that is a good conductor of heat, each channel being fixed to the associated lid element in such a way as to delimit a fluid-tight individual conduit which receives a heat-conveying fluid for the treatment, by heat exchange, of food products contained in said channels.

2. The unit according to claim 1, wherein each individual conduit surrounds the wall of a channel at least substantially completely.

3. The unit according to claim 1, wherein the individual conduits delimited by a channel and an associated lid element communicate with each other to form a single conduit within the unit.

4. The unit according to claim 1, wherein the individual conduits are divided by a discontinuous intermediate partition.

5. The unit according to claim 4, wherein said partition extends longitudinally under the associated channel and is shorter than the channel so as to leave a passage at one end of the partition for the heat-conveying fluid.

6. The unit according to claim 4, wherein said end passages alternate to encourage circulation of the fluid in a chicane.

7. The unit according to claim 1, including connectors for connection to a heat-conveying fluid supply and to means for evacuating the fluid.

8. The unit according to claim 1, wherein the transverse walls of said conduit each include at least one blind hole with an open side facing outwards for grasping and manipulating the unit.

9. A plant for molding and heat treatment of food products, comprising a plurality of stacked units according to claim 8, and equipped with a heat-conveying fluid supply and with means for evacuating the fluid, to each of which each unit is connected.

10. The plant according to claim 9, wherein the fluid is a hot liquid for cooking said food products.

11. The plant according to claim 9, wherein the fluid is a cold liquid for chilling or freezing said food products.

* * * * *